United States Patent [19]

Nikaido

[11] Patent Number: 4,636,668
[45] Date of Patent: Jan. 13, 1987

[54] COMPACT-SIZED PERMANENT MAGNET TYPE STEPPING MOTOR

[75] Inventor: Akira Nikaido, Tokyo, Japan

[73] Assignee: Citizen Watch Co., Ltd., Tokyo, Japan

[21] Appl. No.: 627,885

[22] Filed: Jul. 5, 1984

[30] Foreign Application Priority Data

Jul. 4, 1983 [JP] Japan .................. 58-103727[U]
Jul. 4, 1983 [JP] Japan .................. 58-103728[U]

[51] Int. Cl.⁴ .......................................... H02K 27/26
[52] U.S. Cl. ............................. 310/49 R; 310/42; 310/259
[58] Field of Search ............... 310/49 R, 89, 90, 156, 310/162, 163, 258, 259, 42; 360/106; 384/517, 518, 563

[56] References Cited

U.S. PATENT DOCUMENTS

| 3,804,562 | 4/1974 | Hansson | 384/517 |
| 4,048,548 | 9/1977 | Nakajima et al. | 310/162 |
| 4,221,985 | 9/1980 | Larson et al. | 310/90 |
| 4,224,544 | 9/1980 | McKinnon et al. | 310/49 R |
| 4,347,457 | 8/1982 | Sakamoto | 310/156 |
| 4,423,447 | 12/1983 | Nishida et al. | 360/106 |
| 4,437,027 | 3/1984 | Yamamoto et al. | 310/90 |
| 4,455,499 | 6/1984 | Sudler | 310/49 R |

FOREIGN PATENT DOCUMENTS 879718 11/1981 U.S.S.R. .................. 310/49 R

Primary Examiner—Patrick R. Salce
Assistant Examiner—D. L. Rebsch
Attorney, Agent, or Firm—Koda and Androlia

[57] ABSTRACT

A compact-sized stepping motor including a laminated stator assembly provided on an inner periphery thereof with a plurality of stator poles, stator coils magnetically connected to the laminated stator assembly, and a rotor having a plurality of rotor poles opposed to the stator poles. The rotor has assembled therein a permanent magnet and is rotatably supported between housings. The upper and the lower housings are each provided with a disc-shaped locating portion engageable with the inner peripheries of the stator poles of the laminated stator assembly, and the center-alignment between the stators and the rotor is assured by the locating portions, so that an accurate phasic relationship can be obtained between the rotor and the stators. The laminated stator assembly has a non-magnetic member core plate and a plurality of stator plates laminated on opposite sides of the non-magnetic member core plate. The stator plates are laminated on the core plate such that they are substantially an integral stator plate, and thereafter, the stator plate is separated into stator pieces for each pole associated with the stator coils.

7 Claims, 9 Drawing Figures

4,636,668

COMPACT-SIZED PERMANENT MAGNET TYPE STEPPING MOTOR

BACKGROUND OF THE INVENTION

1. Field of the Invention

This invention relates to a compact-sized stepping motor, and more particuraly to improvements in a compact-sized stepping motor capable of being assembled with stator poles thereof disposed at accurate positions.

2. Description of the Prior Art

Stepping motors capable of conducting locating stops at each of several predetermined step phases have been used in various phase control drive portions, thus achieving high precision locating control action over a wide range of industrial applications.

In recent years, a necessity has been voiced to render the aforesaid stepping motor compact in size. For example, when the stepping motor is used in drive mechanisms for a printer device, a head free mechanism of a floppy disc drive and the like, there is a strong demand to make the stepping motor compact in size. More specifically, recently, floppy disc drives and the like, particularly micro-floppy disc drives, in which a magnetic disc is incorporated in a hard plastic cartridge, have been used; and moreover, as the floppy disc itself is rendered compact in size, the disc drive should inevitably be made compact in size. Along with this tendency, it has become a significant question to improve the head feed mechanism, of which is required high precision feed action in close contact with the surface of a magnetic disc, so that it is compact in size.

With the ordinary stepping motor of the prior art, the arrangement of the stator thereof is particularly complicated. Normally, stator coils are wound around every pole or some poles of the stator, the stepping motor as a whole is large-sized owing to the above-described assembling of the coils to the stator, whereby the diameter of rotor is small as compared with the outer size of the stepping motor, thereby presenting such a disadvantage that satisfactory turning torque and locating accuracy cannot be obtained by a small-sized stepping motor.

Furthermore, in a stepping motor, the clearance between a stator pole and a rotor pole is made as small as possible, whereby the torque can be increased. However, in the conventional stepping motor, there has been such a disadvantage that various errors are permitted in assembling of the stator poles, whereby the aforesaid clearance cannot be satisfactorily decreased.

Additionally, in the conventional stepping motor, the center-alignment between the stators and the rotor seriously affects the aforesaid clearance between the poles. However, in the conventional stepping motor, the center-alignment has been carried out by a locating pin provided on a housing or the like, whereby a satisfactory assembling accuracy cannot be obtained, so that an error is caused in the center-alignment between the stators and the rotor, thus presenting various drawbacks.

Particularly, in the stator pole, a plurality of divided stator pole pieces have been assembled into a stator assembly having an entirely circumferential pole at a final stage, whereby errors in the radial direction among the poles are caused. Because of this, unless a comparatively large clearance from the rotor pole is set, such a disadvantage is caused that there occurs interference between the poles, an increase in the variation of the torque and the like.

SUMMARY OF THE INVENTION

The present invention has been developed to obviate the above-described disadvantages of the prior art and has as its object the provision of an improved compact-sized stepping motor wherein stator poles can be located at accurate positions relative to the rotor, whereby the stepping motor can be rendered compact in size, while obtaining a satisfactory locating accuracy and satisfactory torque.

To the above end, the present invention features that the present invention includes a laminated stator assembly fixed between an upper and a lower housings and provided on the inner periphery thereof with a plurality of stator poles; stator coils magnetically connected to the laminated stator assembly; and a rotor having a plurality of rotor poles opposed to the stator poles, having assembled therein a permanent magnet and rotatably supported between the upper and the lower housings; and the upper and the lower housings are each provided with a disc-shaped locating shoulder engageable with the inner peripheries of the stator poles of the laminated stator assembly, and the center-alignment between the stator and the rotor is provided by the locating shoulders.

Furthermore, the features of the present invention include a laminated stator assembly fixed in the housings and provided on the inner periphery thereof with a plurality of stator poles; stator coils magnetically connected to the laminated stator assembly; and a rotor having a plurality of rotor poles opposed to the stator poles and having assembled therein a permanent magnet; and the laminated stator assembly has a non-magnetic member core plate and a plurality of stator plates laminated on opposite side surfaces of the non-magnetic member core plate. The stator plates are initially laminated on the core plate as an integral stator plate, onto which the stator pole is previously provided, and thereafter, the stator plate is separately formed into stator pieces for each pole associated with the stator coils.

DETAILED DESCRIPTION OF THE PREFERRED EMBODIMENTS

Figure 1:
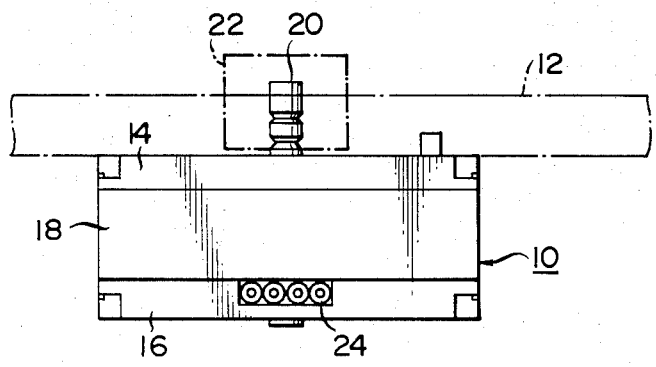
FIG. 1 is a view showing a preferred embodiment of the compact-sized stepping motor according to the present invention.
Figure 2:
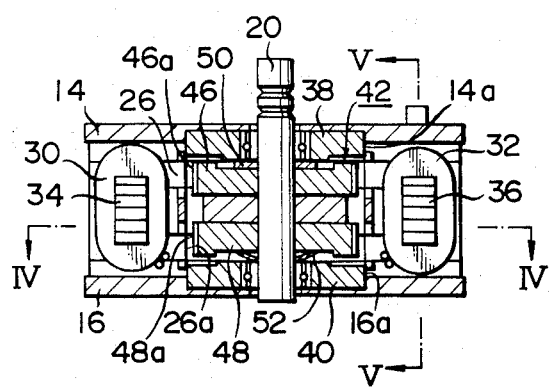
FIG. 2 is a sectional view of this embodiment.
Figure 3:
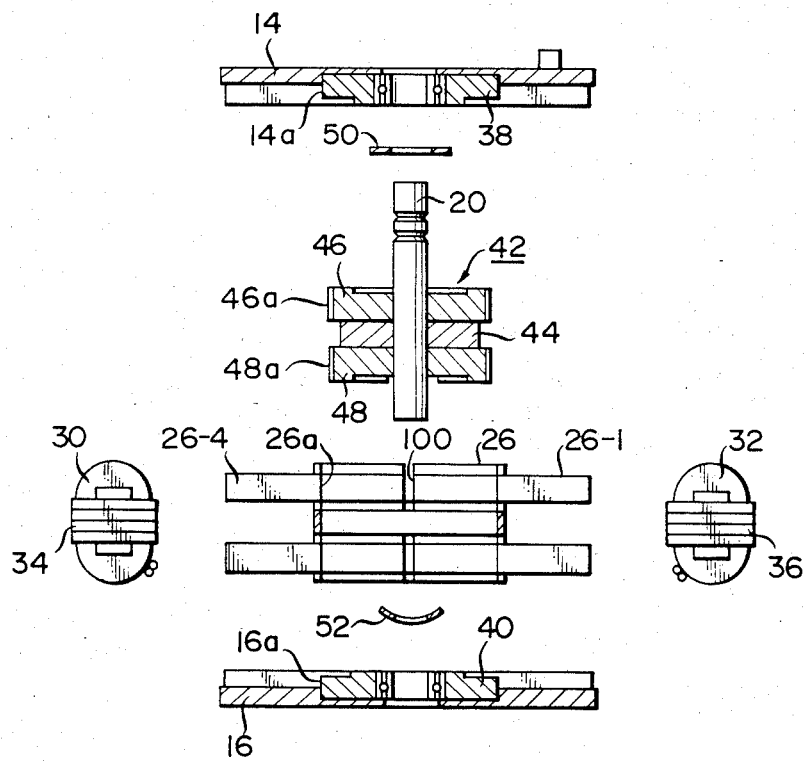
FIG. 3 is a disassembled perspective view of FIG. 2.

Description will hereunder be given of a preferred embodiment of the present invention with reference to the drawings. In FIG. 1, there is shown a small-sized stepping motor according to the present invention, which is used as a head feed motor for a floppy disc drive. In this embodiment, a stepping motor 10 is threadably secured to a floppy disc drive base plate 12.

The stepping motor 10 is constructed such that a stator is clamped between upper and lower housings 14 and 16. Referring to the drawing, the stator is covered by a cover 18. Furthermore, a rotor is rotatably supported by the stepping motor 10. In FIG. 1, a rotor shaft 20 rotatably supported by upper and lower housings 14 and 16 projects into the base plate 12. The rotor shaft 20 is attached with a pulley 22, around which is guided a belt for feeding a head of a floppy disc drive, not shown. In consequence, the pulley 22 can be feedingly driven accurately through a predetermined angle by the stepping motor 10, whereby the head operationally associated with the rotating pulley 22 through the belt moves in the radial direction of a magnetic disc so as to be able to select a desired track.

A stator coil for imparting a magnetic rotation to the stator receives a drive signal from outside through a lead wire 24, whereby the rotor is rotatably driven by a predetermined number of pitches.

FIGS. 2 through 5 show the internal construction of this embodiment in detail. In these drawings, the aforesaid cover 18 is removed from the stepping motor 10.

The stator according to the present invention is formed by a laminated stator assembly 26 being of a thin plate, and provided on the inner periphery thereof with a plurality of stator poles 26a. This stator assembly 26 is located and fixed between the upper and lower housings 14 and 16 through four set-screws 28, whereby the stator assembly 26 is fixed at a predetermined position in the housings of the stepping motor 10.

The stator according to the present invention is constructed such that the stator coils are assembled separately of the aforesaid laminated stator assembly and are magnetically connected to the aforesaid laminated stator assembly. In the embodiment, the stator coils 30 and 32 are disposed at opposite sides of the laminated stator assembly 26, respectively. The stator coils 30 and 32 are wound around laminated coil cores 34 and 36 and opposite ends of the coil cores 34 and 36 are clamped between portions projected from flanks of the laminated stator assembly 26. In this state, the coil cores 34 and 36 together with the laminated stator assembly 26 are fixed in the housings through the aforesaid set-screws 28.

As will be described hereunder, according to the present invention, the laminated stator assembly 26 is divided into four portions associated with both poles of the aforesaid stator coils 30 and 32 by slits 100, 102, 104 and 106, to thereby form four stator pieces 26-1 through 26-4.

In consequence, the laminated stator assembly 26 having a plurality of stator poles 26a according to the present invention and the stator coils 30 and 32 which are assembled separately of the laminated stator assembly 26 are magnetically connected to each other at positions on the outer periphery of the stator as shown, whereby the number of the stator coils 30 and 32 is considerably reduced as compared with the number of stator poles 26a, so that the construction as a whole can be rendered compact in size to an extreme extent without requiring many hours for winding the coils around the respective stator poles and the like as seen in the past.

On the other hand, bearings 38 and 40 are fixed to the upper and lower housings 14 and 16, and the aforesaid rotor shaft 20 of a rotor 42 is rotatably supported by the bearings 38 and 40.

The rotor 42 includes a permanent magnet 44 magnetized in the axial direction of the rotor shaft and rotor yokes 46 and 48 interposing this permanent magnet 44, and a plurality of rotor poles 46a and 48a are formed on the outer periphery of the rotor yokes 46 and 48. A predetermined phasic relationship is set between the rotor poles 46a and 48a and the aforesaid stator poles 26a, so that a desirable step rotational action can be achieved.

When the rotor 42 is assembled into the upper and the lower housings 14 and 16, a locating washer 50 is assembled on the side of the bearing 38 and a spring washer 52 is assembled on the side of the bearing 40, whereby the rotor shaft 20 is constantly urged against the upper housing 14, so that the rotor 42 can be rotatably driven without its position in the axial direction fluctuating.

The characteristic feature of the present invention resides in that, in order to accurately center-align the stator 26 with the rotor 42, the upper and the lower housings 14 and 16 are each provided with a disc-shaped locating shoulder engageable with the inner periphery of the stator poles 26a of the laminated stator assembly 26. In the embodiment, the outer peripheries of the bearings 38 and 40 affixed to the housings 14 and 16 are used as locating shoulders 14a and 16a. As is apparent from FIGS. 2 and 3, the aforesaid locating shoulders 14a and 16a are engaged with the inner peripheral surfaces of the aforesaid stator poles 26a, whereby the axis of the inner peripheries of the stator poles is accurately center-aligned with the axis of the upper and the lower housings 14 and 16, i.e. the axis of the rotor 42. More specifically, the locating shoulders 14a and 16a are assembled on about the axes of the bearings 38 and 40. In consequence, the rotor poles 26a engaged with these locating shoulders 14a and 16a can be accurately center-aligned with the bearing portion. On the other hand, the rotor poles 46a and 48a of the rotor 42 are assembled on about the axis of the rotor shaft 20 as is well known, whereby the stator poles 26a and the rotor poles 46a and 48a are provided on and assembled about a common axis, so that the errors in working and assembling can be suppressed to the minimum, thereby minimizing the error in the clearance between the poles and to obtain a desired smallest clearance.

Additionally, it is preferable to finally polish the outer peripheries of the stator poles 26a of the laminated stator assembly 26 in the assembled condition, so that any error in the portions engageable with the locating shoulders 14a and 16a can be made small.

Figure 4:
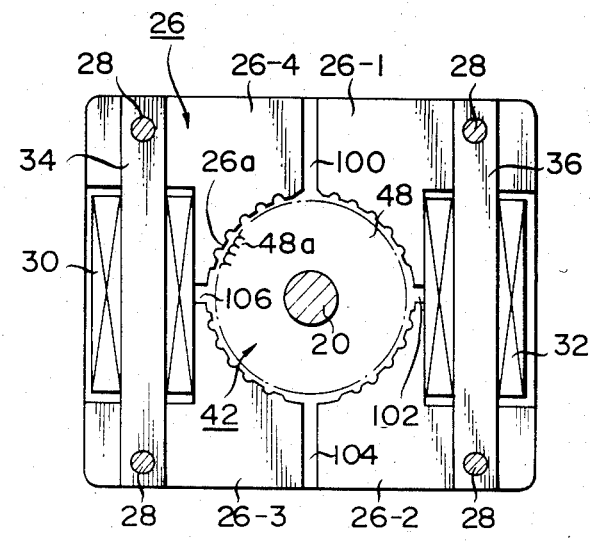
FIG. 4 is a sectional view taken along the line IV—IV in FIG. 2.
Figure 5:
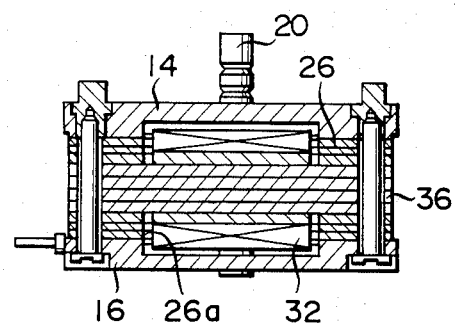
FIG. 5 is a sectional view taken along the line V—V in FIG. 2.

As apparent from the illustration of FIG. 4, the laminated stator assembly 26 is divided into four stator pieces 26-1 through 26-4 associated with the poles of the two stator coils 30 and 32 in the embodiment. However, if the divided stator pieces described above are produced separately of one another and assembled, then considerably large errors occur between the stator poles 26a, resulting in cases where a desired assembling accuracy, particularly, an accurate phasic arrangement with the rotor poles 46a and 48a cannot be obtained.

This embodiment makes it possible to arrange the divided stator pieces described above in a stator pole arrangement with high accuracy. Because of this, the laminated stator assembly features an integral stator plate, on which is previously provided a stator pole, which is laminated on a core plate, and then, only the stator plate is separately finished for each pole associated with each stator coil. A description will now be given of the construction with reference to FIGS. 6 through 9.

Figure 6:
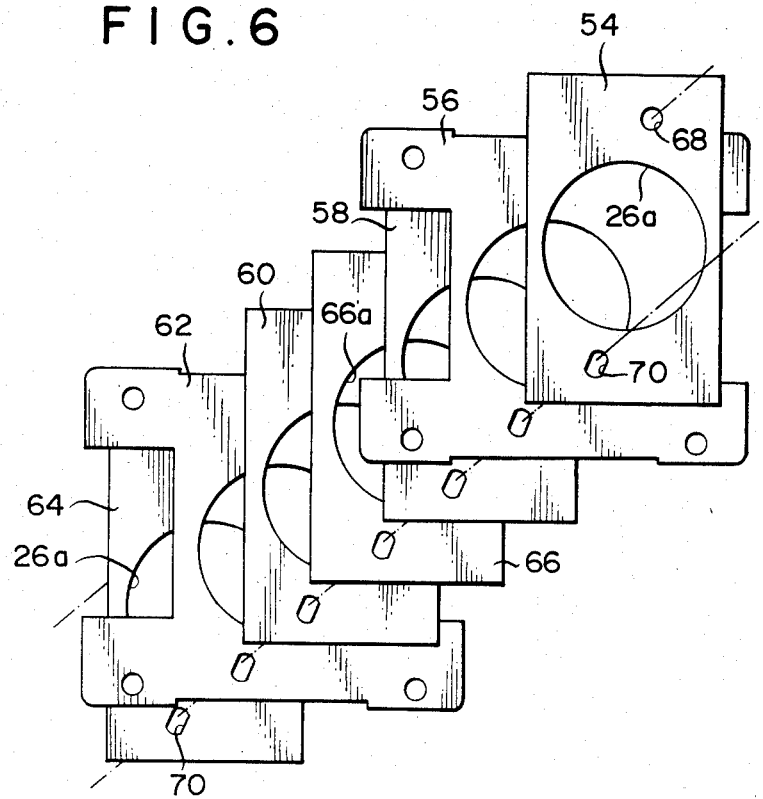
FIG. 6 is a disassembled perspective view showing the state prior to the assembling of the laminated stator assembly.
Figure 7:
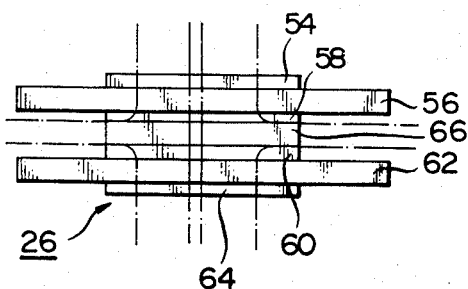
FIG. 7 is a front view in the assembled state of FIG. 6.

As apparent from FIG. 6, the disassembled view, six types of integral stators 54, 56, 58, 60, 62 and 64, each of which is composed of a plurality of thin plates laminated on one another, are arranged with a non-magnetic core plate 66 being interposed as shown in FIG. 7. The integral stator plates 54 and 64 and the core plate 66 have locating holes 68 and 70 common to all of the plates. Predetermined jigs are inserted through these locating holes 68 and 70 to assemble the plates, whereby the stator poles 26a, which have been formed in the plates and a relief hole 66a of the core plate 66, are accurately center-aligned; thereby the side surfaces of all of the plates are fixed to one another in a condition where the plates are thus laminated as shown in FIG. 7. For example, layers are fixed to one another by laser fusion or the like, so that the aforesaid laminated stator assembly 26 can be formed.

As apparent from FIG. 6, according to the present invention, the stator poles 26a are provided as the integral stator plates 54 and 64, so that the pitch between the poles and other accuracies can be satisfactorily maintained.

Figure 8:
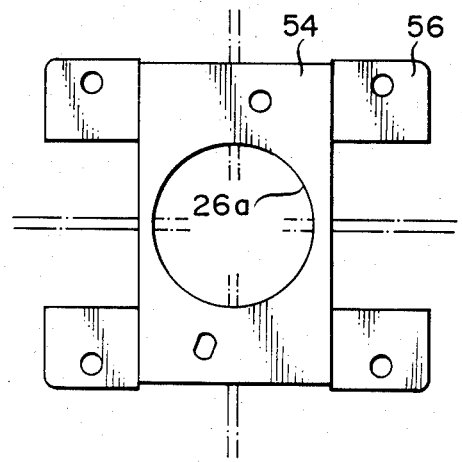
FIG. 8 is a plan view of FIG. 7.

FIG. 8 shows the plan view in which the integral stator plates 54 and 64 and the core plate 66 are laminatedly assembled. In this stage of construction, the divided stator pieces associated with the poles of the aforesaid stator coils do not exist as yet, so that the desired magnetic poles do not exist in the stator poles 26a.

Because of this, in this embodiment, in the laminatedly assembled condition as shown in FIGS. 7 and 8, at opposite sides of the core plate 66, one group of integral stator plates 54, 56 and 58 laminated in three layers and another group of integral stator plates 60, 62 and 64 also laminated in three layers are separately formed into stator pieces, respectively. The separated forming in the embodiment is achieved by slit forming indicated by chain lines in FIGS. 7 and 8 at the opposite sides of the core plate 66, and hence, it is understandable that, in the laminated stator assembly 26, as shown in FIG. 9, the integral stator plates 54 to 64 are separately formed into four stator pieces 26-1 to 26-4 by slits 100 to 106.

Figure 9:
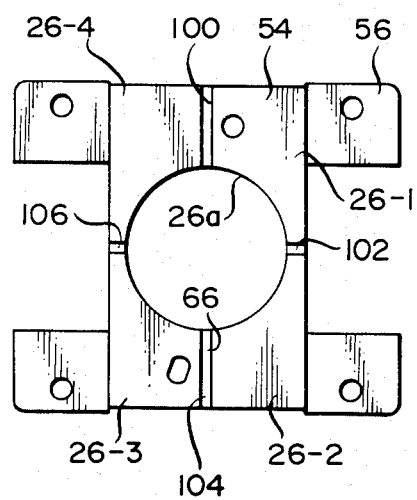
FIG. 9 is a plan view showing the state where the stator pieces are separated from one another in FIG. 8.

As shown in FIG. 7, according to the present invention, only the integral stator plates 54 to 64 are separated and the core plate 66 is left intact as an integral plate, whereby, even in the completed condition as shown in FIG. 9, the stator poles 26a of the stator pieces 26-1 to 26-4 are maintained by the core plate 66 in the same condition as during the integrated forming, thus enabling one to obtain a stator pole arrangement with very high accuracy.

In consequence, in the condition shown in FIG. 9, the stator pieces 26-1 and 26-2 can form separated poles associated with the poles of the stator coil 32 in FIG. 4, while, the stator pieces 26-3 and 26-4 can form separated poles associated with the poles of the stator coil 30, respectively.

As has been described hereinabove, according to the present invention, the stator poles and the rotor poles have, center axis therebetween, whereby eccentric errors between the poles can be suppressed considerably and whereby the clearances from the rotor poles can be reduced so that a desired driving torque can be obtained, thereby contributing to rendering the stepping motor compact in size.

What is claimed is:

1. A compact-sized stepping motor wherein said stepping motor includes:
    a laminated stator assembly fixed in an upper and a lower housing and provided on the inner periphery thereof with a plurality of stator poles, said laminated stator assembly comprising a plurality of thin magnetic plates laminated to a nonmagnetic core plate and four slits extending only through the magnetic plates and dividing said magnetic plates into four equal portions, adjacent ones of said four slits being angularly separated by 90 degrees:
    stator coils magnetically connected to said laminated stator assembly;
    a rotor having a plurality of rotor poles opposed to said stator poles, having assembled therein a permanent magnet and rotatably supported between the upper and the lower housings; and
    the upper and the lower housing each provided with a disc-shaped locating shoulder engageable with the inner peripheries of the stator poles of the laminated stator assembly whereby the center-alignment between said stator and the rotor is carried out by said locating shoulders.

2. A compact-sized stepping motor as set forth in claim 1, wherein said rotor is fixed thereto with a pulley, around which is guided a belt for feeding a head of a floppy disc drive, and said pulley steppingly feeds said head to move in the radial direction of a magnetic disc so as to be able to select a desired track.

3. A compact-sized stepping motor as set forth in claim 1 or 2, wherein said stator coils are disposed at opposite sides of the laminated stator assembly, said stator coils are wound around laminated coil cores and opposite ends of said coil cores are clamped between portions projected from flanks of the laminated stator assembly, and, in this state, said coil cores together with the laminated stator assembly are fixed in the housings through set-screws.

4. A compact-sized stepping motor as set forth in claim 1, wherein said rotor includes the permanent magnet magnetized in the axial direction of a rotor shaft and rotor yokes interposing said permanent magnet therebetween, and a plurality of rotor poles are formed on the outer periphery of said rotor yokes, and a predetermined phasic relationship is given between said rotor poles and said stator poles, so that a desirable step rotational action can be achieved.

5. A compact-sized stepping motor as set forth in claim 1, wherein said rotor is urged against one of the housings by a spring to be prevented from being displaced in the axial direction of said motor.

6. A compact-sized stepping motor wherein said stepping motor includes:
    a laminated stator assembly fixed in housings and provided on the inner periphery thereof with a plurality of stator poles, said laminated stator assembly comprising a plurality of thin magnetic plates laminated to a non-magnetic core plate and four slits extending only through the magnetic plates and dividing said magnetic plates into four equal portions, adjacent ones of said four slits being angularly separated by 90 degrees;
    stator coils magnetically connected to said laminated stator assembly; and
    a rotor having a plurality of rotor poles opposed to said stator poles and having assembled therein a permanent magnet.

7. A compact-sized stepping motor as set forth in claim 6, wherein said stator plates are each separately formed into four stator pieces.

* * * * *